United States Patent [19]

Winter, deceased et al.

[11] 4,019,405
[45] Apr. 26, 1977

[54] VARIABLE SPEED POSITIVE GEAR TRANSMISSION

[76] Inventors: Carl E. Winter, deceased, late of Los Angeles, Calif.; by Julia Winter Cohen, legal representative, 2444 Madison Road, Apt. 1210, Cincinnati, Ohio 45208

[22] Filed: Jan. 16, 1975

[21] Appl. No.: 541,385

[52] U.S. Cl. .............................. 74/691; 74/190.5
[51] Int. Cl.² ...................................... F16H 37/05
[58] Field of Search ................. 74/190, 190.5, 691

[56] References Cited
UNITED STATES PATENTS

| | | | |
|---|---|---|---|
| 973,793 | 10/1910 | Leech | 74/190 |
| 2,921,479 | 1/1960 | Thomas | 74/190 |

*Primary Examiner*—Samuel Scott
*Assistant Examiner*—Wesley S. Ratliff, Jr.

*Attorney, Agent, or Firm*—Melville, Strasser, Foster & Hoffman

[57] ABSTRACT

A flat disc is provided with pie-shaped segments of gear teeth running from the periphery towards the center of the disc in parallel relationship separated by blank segments on the face of the disc. First and second pinion gears are positioned over the face and coupled for movement towards and away from the center of the disc simultaneously along splined shafts. The geometry is such that when one of the pinion gears is in meshing engagement with a toothed segment, the other pinion gear is positioned over a blank segment. The pinion gears are thus alternately driven by the toothed segments and a change in speed ratio between the rotating disc and pinion gear shafts is effected by varying the radial distance of the pinion gears from the center of the disc.

4 Claims, 4 Drawing Figures

U.S. Patent          April 26, 1977          4,019,405
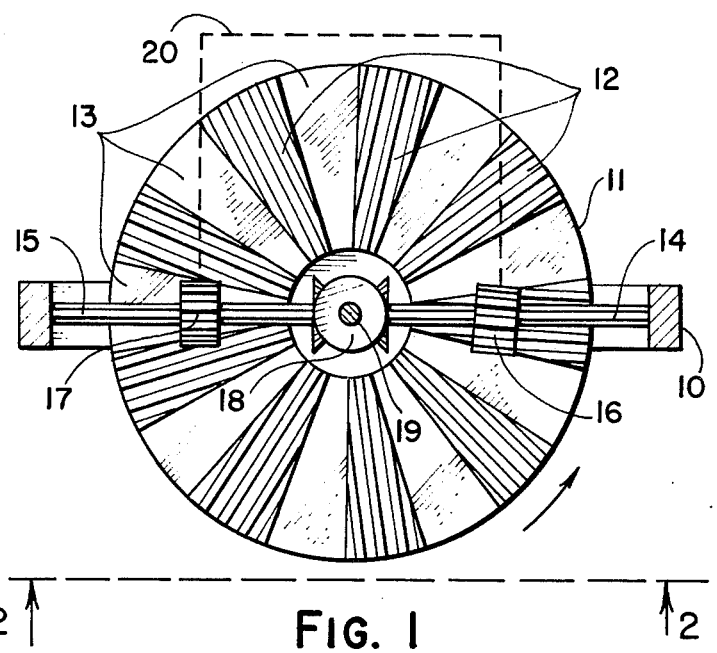
FIG. 1
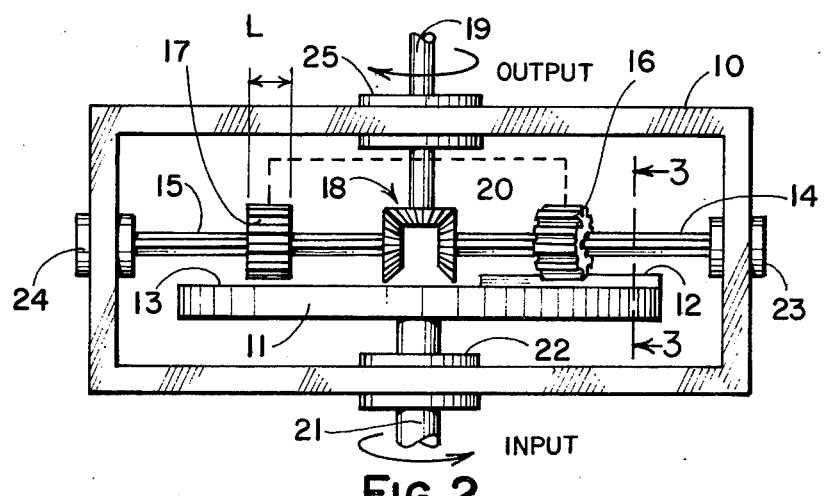
FIG. 2
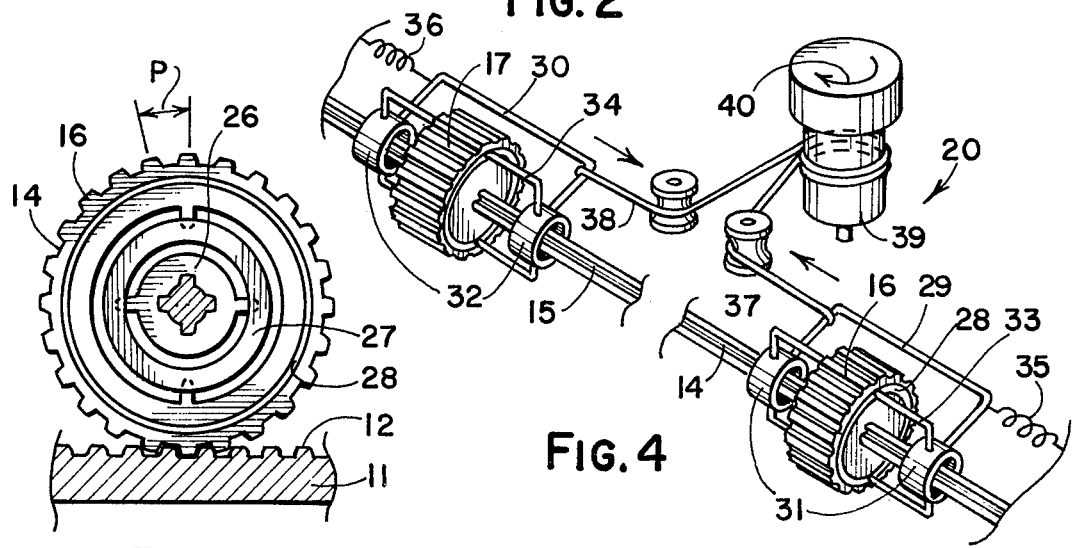
FIG. 3
FIG. 4

VARIABLE SPEED POSITIVE GEAR TRANSMISSION

This invention relates to gear transmission systems and more particularly to an improved variable speed positive gear transmission.

BACKGROUND OF THE INVENTION

There are many available types of variable speed gear transmissions on the market today. Many of these systems operate of the principle of moving a wheel along the face of a rotating disc from the periphery towards the center of the disc to cause a continuous variation in speed. Similar systems may move a wheel along the surface of a cone back and forth between smaller and larger diameter portions of the cone.

While systems of the foregoing type will enable a smooth and continuous variation in speed ratios between an input and output shaft, the actual transmission is effected through friction coupling as opposed to a positive gear type coupling. Thus, the loads that can be transmitted are necessarily limited.

On Jan. 27, 1959 a U.S. Pat. No. 2,870,644 entitled IMPROVED MULTIPLE SPEED GEAR TRANSMISSION issued to the inventor of this present application which, in essence, constitutes an improvement over the earlier united States Patent.

Essentially, the foregoing United States Patent disclosed and claimed a positive gear arrangement wherein a variable speed ratio between an input and an output shaft could be realized over large numbers of values without utilizing the frictional concepts but rather employing a positive gear coupling. In that prior patent, the preferred embodiment contemplated the use of a pair of opposed discs with a pinion gear coupled between the discs.

BRIEF DESCRIPTION OF THE PRESENT INVENTION

The present invention constitutes an improved version of a variable speed positive gear transmission operating on principles very similar to those set forth in the above-mentioned United States Patent but wherein only a single disc is utilized as opposed to the twin opposing discs as shown in the preferred embodiment of the patent.

More particularly, in accord with the present invention a flat circular disc is provided having on its face an odd number of pie shaped toothed segments upon each of which parallel teeth are defined running from the periphery towards the center of the disc in parallel relationship to a diameter of the disc bisecting the pie-shaped segment. These segments are equally circumferentially spaced about the disc face to define an odd number of pie-shaped blank segments therebetween such that there is always a blank segment directly diametrically opposite a toothed segment.

With the foregoing arrangement, first and second coaxially aligned individually mounted shafts may be positioned over the face of the disc in alignment with a diameter of the disc when viewed in plan. First and second pinion gears mounted on these shafts respectively are coupled for sliding movement along the shafts and yet keyed to the shafts for rotating the same. Suitable means are provided for causing the first and second pinion gears to move towards and away from each other in unison.

With the foregoing arrangement, one pinion gear will be in threaded engagement with a toothed segment on the disc when the other is out of engagement with any toothed segment as a result of the presence of a blank segment thereunder. Accordingly, rotation of the disc will alternately drive the first and second pinion gears in opposite directions. This motion in turn will result in movement of the shafts supporting the pinion gears in opposite directions and these motions can be coupled through a central gear system to an output shaft.

By varying the radial distance of the pinion gears from the center of the rotating disc, a smooth variation in speed can be accomplished while still maintaining positive gearing.

BRIEF DESCRIPTION OF THE DRAWINGS

A better understanding of the present invention will be had by now referring to the accompanying drawings in which:

FIG. 1 is a plan view with a certain portion broken away of a variable speed positive gear transmission in accord with this invention;

FIG. 2 is a front elevational view looking in the direction of the arrows 2—2 of FIG. 1;

FIG. 3 in a fragmentary cross section taken in the direction of the arrows 3—3 of FIG. 2; and, FIG. 4 is a schematic perspective view illustrating mechanical control means utilized with portions of the structure shown in FIGS. 1 and 2.

DETAILED DESCRIPTION OF THE INVENTION

Referring first to FIG. 1, there is shown a portion of a frame 10 to which is rotatably mounted a flat circular disc 11. As shown, the disc 11 has on its front face an odd number of pie-shaped toothed segments 12 equally circumferentially spaced about the disc face such that an odd number of pie-shaped blank segments 13 are defined therebetween. By utilizing an odd number of toothed segments 12 with equiangular extent corresponding to the angular spacing between the toothed segments defining the blank segments, there will always be a blank segment directly diametrically opposite a toothed segment.

Each of the toothed segments includes parallel teeth running from the periphery towards the center of the disc in parallel relationship to a diameter of the disc bisecting the pie-shaped toothed segment. With this arrangement, the pitch of the teeth will always remain the same regardless of how close or how far they are from the center of the disc. On the other hand, there will be a greater number of teeth towards the periphery than towards the center because of the constant pitch and the pie-shape of the segment.

First and second coaxially aligned shafts 14 and 15 are individually bearingly supported by the frame 10 in a position over the face of the disc in alignment with a diameter of the disc when viewed in plan as shown in FIG. 1. First and second pinion gears 16 and 17 are mounted respectively on these shafts and keyed to the shafts for slidable movement along the shafts and also for rotating the shafts.

A central gear means 18 intercouples the inner opposed ends of the shafts 14 and 15 for rotation in opposite directions about their common axis. It will be noted that the central gear means 18 is disposed over the center of the face of the disc when viewed in plan. An output shaft 19 is coupled to this central gear means 18.

In FIG. 1 the pinion gears 16 and 17 are shown schematically coupled by the dashed line 20, this line 20 respecting a mechanical means which can effect inward and outward motion of the pinion gears 16 and 17 along their respective shafts in unison such that they will always remain an identical radial distance from the center of the disc. The mechanism 20 will be described in detail hereafter.

Referring now to the front elevational view of FIG. 2, it will be noted that the flat disc 11 is mounted on an input shaft 21 bearingly supported to the frame 10 as at 22. Further right and left bearings 23 and 24 are clearly shown in FIG. 2 for the first and second shafts 14 and 15 to support the same. Finally, there is illustrated in FIG. 2 an upper bearing 25 for the output shaft 19.

The central gear means 18 described in FIG. 1 and also illustrated in FIG. 2 is seen to comprise simply end bevel gears for the shafts 14 and 15 and a top bevel gear connected to the output shaft 19. It will be evident that the shaft 19 will rotate in one direction when the first pinion gear rotates in one direction and the second pinion gear 17 rotates in an opposite direction. Further, it will be evident from FIG. 2 as well as FIG. 1 that when one pinion gear is in meshing engagement with a toothed segment 12, the other pinion gear is free of any engagement, the same being positioned over a blank segment.

By utilizing a fairly large number of individual pie-shaped segments such as illustrated in FIG. 1, the direction of the parallel teeth from the periphery towards the center will approach a radial direction, the center tooth of the parallel teeth actually coinciding precisely with the radial direction. However, because of the parallel relationship of the teeth on each side of the radially directed central tooth of each sector, proper meshing of the pinion gear with the teeth can only be effected, assuming that the teeth on the pinion gear are of an appreciable length, when the pinion gear teeth are parallel to the teeth on the toothed segment. To maintain the parallel relationship of the teeth for proper meshing throughout the small arcuate swinging movement, it is important that the pinion gear be capable of swivelling slightly on its shaft.

In both FIGS. 1 and 2, the first pinion gear 16 is shown slightly swivelled in order that its gear teeth will be in proper alignment with the gear teeth on the segment with which it is in engagement. It will be understood that as the disc 11 turns in a counterclockwise direction as viewed in FIG. 1, when the last of the gear teeth on the segment leaves the pinion gear 16, the pinion gear 16 will have assumed a swivelled direction opposite to that shown in FIG. 1. Each of the pinion gears will only be in a non-swivelled position when its gear teeth are meshing with the center gear tooth of each toothed segment; that is, the particular gear tooth that is in radial alignment.

To permit easily the desired swivelling movement of each of the pinion gears as they traverse across the toothed segments, a gimbal mounting is provided.

With specific reference to FIG. 3, the gimbal mounting includes an inner gimbal ring 26 and an outer gimbal ring 27 the same being intercoupled in the usual manner of a gimbal. It will be noted in FIG. 3 that the shaft 14 is splined so as to be rotationally locked to the pinion gear although the pinion gear is capable of sliding movement along the shaft.

It is to be appreciated that it would be possible to provide a very short length of gear on each of the pinions such that the same were almost in the form of simple pegs. In this event, there would not be involved problems of intermeshing with the gears on the toothed segments and the swivelling arrangement would not really be necessary. On the other hand, with such a short length of tooth, the force to be transmitted would be somewhat limited.

An important feature of the present invention is the concept of providing a great many toothed segments circumferentially distributed as shown wherein each of the segments is of relatively small angular extent so that any swivelling of the pinion is minimized and yet the pinion may include relatively long teeth to thereby provide strong transmission coupling.

With reference to FIG. 2, and by way of example, the length of the tooth on the pinion gear such as the pinion gear 17 is designated L. This length is substantially greater and certainly more than twice as great as the pitch of the teeth on the pinion gear which dimension is indicated at P in FIG. 3. In the case of peg-like teeth wherein swivelling would not be necessary, L would equal P.

Still referring to FIG. 3, it will be noted that the face of the extreme outer portion of the pinion gear 16 includes an annular bearing groove 28. This groove cooperates with an engaging means which constitutes part of a carriage structure for enabling the pinion gear to be moved along the splined shaft 14 while it is rotating.

In respect to the foregoing, reference is now had to FIG. 4 which shows, merely by way of example, one means schematically indicated at 20 in FIGS. 1 and 2 for effecting movement of the pinion gears towards and away from each other along their respective shafts in unison.

In the specific example of FIG. 4, there are provided first and second carriages 29 and 30 including sleeve pairs 31 and 32 straddling respectively the pinion gears 16 and 17. The sleeves 31 and 32 are not coupled to the first and second shafts 14 and 15 but rather constitute mere journal bearings therefor, the shafts 14 and 15 rotating inside the sleeves 31 and 32.

As shown, each of the sleeves include engaging means in the form of diametrically oppositely extending rod structures which turn inwardly towards the opposite faces of the various pinion gears such as indicated at 33, the extreme ends of these rod structures being received in the annular grooves such as the groove 28 described in FIG. 3. The corresponding engagement pin or rod is shown at 34 for the second pinion gear 17.

These engagement means are mounted on the sleeves as described and constitute part of the carriage structure 29 and 30.

Each of the first and second carriages 29 and 30 is connected to an outer spring such as indicated at 35 and 36 which normally exerts a pulling force on the carriages tending to separate the carriages and thus the pinion gears 16 and 17. In other words, if not opposed, the springs 35 and 36 would pull the carriages and thus the pinion gears to their outermost extent towards the periphery of the disc 11.

Opposing the tension of the springs 35 and 36 are pull lines 37 and 38 connected to the carriages 29 and 30 and extending inwardly towards the central portion of the structure and thence around suitable pulleys to wind in the same direction on a drum 39.

With the foregoing arrangement, it will be appreciated that when the drum 39 is rotated as in the direction of the arrow 40 by the handle secured thereto, the pulling force on the lines 37 and 38 will move the carriages and thus the pinions 16 and 17 towards each other in unison. Relaxing of the winding force on the drum 39 will permit the springs 35 and 36 to retract the carriages 29 and 30 and thus the pinion gears 16 and 17 away from each other.

OPERATION

The operation of the variable speed positive gear transmission will be evident from the foregoing description. Assume that the first and second pinion gears 16 and 17 are positioned substantially as shown in FIGS. 1 and 2, such that the first pinion gear is in meshing engagement with one of the toothed segments 12 while the second pinion gear 17 is positioned over a blank segment. Assume that the input shaft 21 as shown in FIG. 2 is rotated in the direction indicated by the arrow such that the flat disc 11 rotates in a counterclockwise direction as viewed in plan in FIG. 1.

It will be appreciated that the pinion gear 16 will be positively driven to rotate the shaft 14 and this motion will be communicated through the double gears to the output shaft 19. When the first pinion gear 16 leaves the tooth segment 12, the second pinion gear 17 will pick up on of the toothed segments 12, this latter pinion gear then being rotated in an opposite direction to rotate its shaft 15 in a direction opposite to the previous rotation of the shaft 14.

With reference to FIG. 2, the opposite rotation of the shaft 15 through the bevel gear structure 18 will cause the shaft 19 to still rotate in the same direction.

The first and second pinion gears will thus be alternately driven by the toothed segments and the gimbal mounting for each on their respective shafts will assure smooth and strong intermeshing gear contact.

To change the speed ratio between the input and output shafts 21 and 19, it is only necessary to vary simultaneously the radial distance of the first and second pinion gears 16 and 17 from the central portion of the disc. Thus, by use of suitable mechanical means indicated generally at 20 in FIGS. 1 and 2, if the pinion gears 16 and 17 are moved radially outwardly, they will each successively engage a greater number of gear teeth on each of the toothed segments for a given angular rotation of the disc 11 so that the output shaft 19 will be turned at a greater speed relative to the speed of rotation of the disc 11 and input shaft 21.

When the first and second pinion gears 16 and 17 are moved inwardly towards the center, fewer teeth on each of these segments for a given angular movement of the disc 11 will be in meshing engagement with the pinion gears successively so that the output shaft 19 will make fewer revolutions for each revolution of the disc 11.

It will accordingly be evident that a smooth variation in the speed ratio between the input and output shafts can be effected by moving the pinion gears inwardly and outwardly. Moreover, there is always assured a positive tooth engagement through the gear train between the input and output shafts and there is also assured substantial strength in the transmission because of the fact that relatively long teeth can be utilized on the pinion gears.

From the foregoing description, it will thus be evident that the present invention has provided an improved variable speed positive gear transmission system.

What is claimed is:

1. An infinitely variable speed positive gear to gear contact transmission including:
   a. a frame;
   b. an input shaft bearingly supported in said frame;
   c. an output shaft bearingly supported in said frame;
   d. a flat circular disc mounted on one of said input and said output shafts and having on its face an odd number of pie shaped toothed segments upon each of which parallel teeth are defined running from the periphery towards the center of the disc in parallel relationship to a diameter of the disc bisecting the pie shaped toothed seegment, said pie shaped toothed segments being equally circumferentially spaced about the disc face to define an odd number of pie shaped blank segments therebetween such that there is always a blank segment directly diametrically opposite a toothed segment;
   e. first and second coaxially alligned shafts individually bearingly supported by said frame in a position over said face of said disc in alignment with a diameter of the disc when viewed in plan;
   f. first and second pinion gears mounted on said first and second coaxially aligned shafts respectively and keyed to the shafts for slidable movement along the shafts, said pinion gears being equally radially spaced outwardly from the center of the disc, one pinion gear being in threaded meshing engagement with a toothed segment whenever the other is out of engagement with any toothed segment as a result of the presence of a blank segment thereunder, by virtue of which there is continuous meshing engagement between selective ones of said pinion gears and said flat circular disc;
   g. means to adjust the radial distance of said pinion gears from the center of the disc to thereby adjust the ratio of the speed between the input and output shafts;
   h. and central gear means mounted on the other of said input and said output shafts and intercoupling the inner opposed ends of the said first and second coaxially aligned shafts which are rotatable in opposite directions about their common axis so that when said first and second pinion gears alternatively rotate in opposite directions said central gear means rotates continuously in one direction, said central gear means being disposed over the center of the face of said disc when viewed in plan;
   by virtue of all of which rotation of said input shaft effects rotation of said output shaft regardless of whether said pinion gears drive said disc or said disc drives said pinion gears.

2. A transmission according to claim 1 in which each of said pinion gears is provided with teeth having a length in an axial direction greater than twice their pitch whereby the coupling strength of the transmission is increased 3. A variable speed positive gear transmission as recited in claim 1 wherein the said means to adjust the radial distance of said pinion gears from the center of said disc includes first and second positioning means for slidably moving said respective first and second pinion gears to equal radial locations on said first and second shafts.

4. A variable speed positive gear transmission as recited in claim 1 wherein each of said pinion gears includes a gimbal mounting means coupling a pinion gear to its associated shaft for permitting the pinion gear to swivel through an angle required for proper meshing with the parallel teeth of a toothed segment on said flat circular disc.

* * * * *

UNITED STATES PATENT OFFICE
CERTIFICATE OF CORRECTION

Patent No. 4,019,405                    Dated April 26, 1977

Inventor(s) CARL E. WINTER, deceased, late of Los Angeles, Calif.; by JULIA WINTER COHEN, legal representative, 2444 Madison Road, Apt. 1210, Cincinnati, Ohio 45208

It is certified that error appears in the above-identified patent and that said Letters Patent are hereby corrected as shown below:

Column 1, Line 12, the word "of" should be on;

Column 1, Line 28, the word "united" should be United;

Column 3, Line 3, the word "respecting" should be representing;

Column 5, Line 27, the word "on" should be one.

Claim 1, penultment line, after the word "disc" the following should be inserted (in which event said disc is on said output shaft and said central gear means is on said input shaft);

Claim 1, last line, after the word "gears" insert the following (in which event said disc is on said input shaft and said central gear means is on said output shaft)

Signed and Sealed this twenty-sixth Day of July 1977

[SEAL]

Attest:

RUTH C. MASON
*Attesting Officer*

C. MARSHALL DANN
*Commissioner of Patents and Trademarks*